Oct. 29, 1940.　　　　　V. S. PENOTE　　　　　2,219,599

METHOD OF JOINING INTERSECTING TUBULAR MEMBERS

Filed Oct. 1, 1938

INVENTOR.
Vincent S. Penote
BY Bates, Goldrich, & Teare
ATTORNEYS

Patented Oct. 29, 1940

2,219,599

UNITED STATES PATENT OFFICE 2,219,599

METHOD OF JOINING INTERSECTING TUBULAR MEMBERS

Vincent S. Penote, Euclid, Ohio

Application October 1, 1938, Serial No. 232,729

4 Claims. (Cl. 29—148.2)

This invention relates to an improved method of joining rods, tubes, bars or the like together, and more particularly to an improved method of welding one member, such as, for instance, a tube, to another member or tube with the end of one member abutting the side surface of the other, so as to form a T. This, therefore, is the general object of the present invention.

At the present time, many frame structures are formed by welding various metallic members together. Such frames generally utilize members having comparatively flat side surfaces, so as to facilitate the joining of the members one to the other. It is, however, a decided advantage to utilize tubes, rather than flat-surfaced members, because of the strength and lightness of the tubes, in comparison to flat-surfaced members. However, the welding of tubes together in frame structures generally requires the welding of the end of one tube to the side surface of another tube to form, for instance, a T-connection between the two members. Heretofore, such connections have been made by first cutting the end of one member to fit the contour of the other member, and then welding the two together by the usual arc or gas welding methods.

The connection between two tubes, when made as above described, entails considerable expense, as well as waste of material, and therefore has in many instances precluded the use of tubes in frame constructions. The present invention, however, contemplates the provision of a method of joining one tube to another to form a T, in such a manner that the ends of tubes may be formed by a comparatively straight cut, thus facilitating the use of the usual metal-cutting saws. This is a more specific object of my invention.

I preferably accomplish the objects of this invention by placing a metallic member intermediate the surfaces secured together, in such a manner that it will not only permit the cutting of the tube by ordinary metal-cutting saws, but which, in addition, will not weaken either of the tubular members in the areas of the weld.

Other objects and advantages of this invention will become more apparent from the following description, reference being had to the accompanying drawing wherein I illustrate tubes connected together by my improved method. The essential features of the invention will be summarized in the claims.

Figure 2:
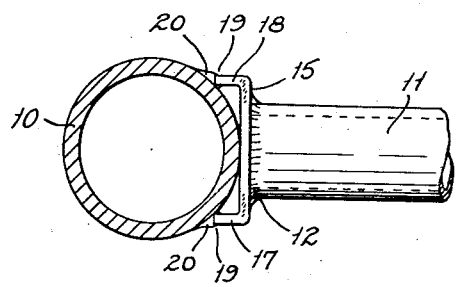
Figure 4:
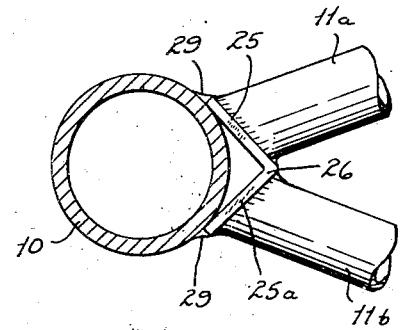
Figure 1:
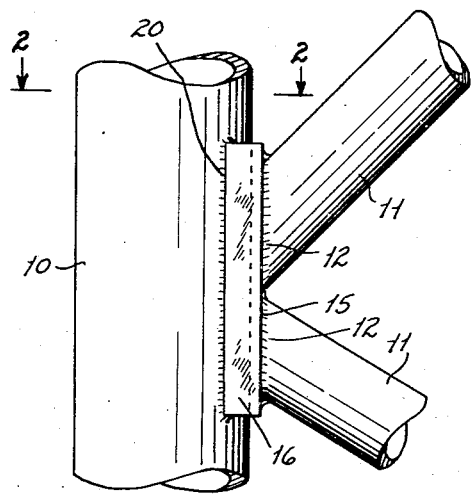
Figure 3:
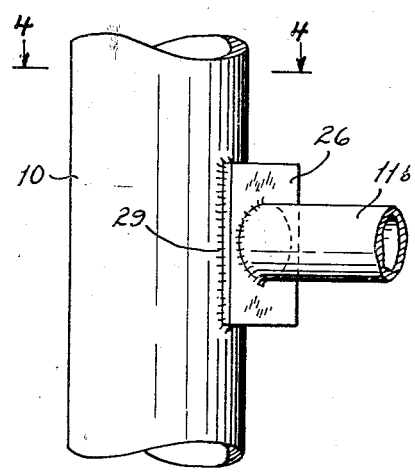
Figure 5:
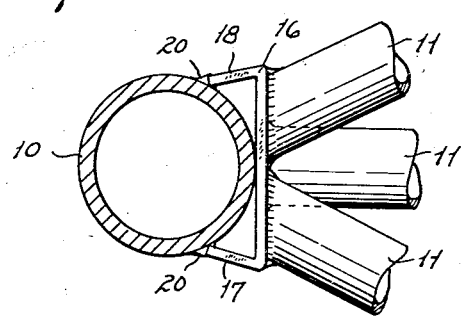

In the drawing, Fig. 1 is a side elevation of a welded connection, made in accord with my invention; Fig. 2 is a transverse section, as indicated by the lines 2—2 on Fig. 1; Fig. 3 is another joint produced by the use of my improved method; Fig. 4 is a section as indicated by the lines 4—4 on Fig. 3; Fig. 5 is a section similar to Fig. 2, and illustrating a still further form of connection.

In the drawing I have illustrated in each instance a tubular member 10, to the side of which I have joined one or more tubular members 11, so as to form various T-connections with the member 10. As illustrated in the drawing, in each instance the end of the member 11, which is to join the tube 10, was cut or severed from a stock bar by an ordinary saw or straight surface cut, which may be either normal to the axis of the tube 11 or at any other desired angle thereto.

The end 12 of each member 11 is welded to a planular surface 15 of an intermediate metallic member 16. This member is provided with a pair of side flanges 17 and 18, the ends 19 of which are welded to the tube 10 with a longitudinally extending weld 20. As shown in Figs. 1, 2 and 5, these tubular members may extend from the flat surface 15 of the member 16 in any direction. I also contemplate the welding of a plurality of members 11 to the intermediate or connector member 16, as shown in Fig. 5.

Where a plurality of rods 7 are to be joined to the rod 10, and extend therefrom in opposite directions, as shown in Fig. 4, I contemplate substituting for the channel-shaped connector member 16 of Fig. 1, an angle member 26, shown in Figs. 3 and 4, the legs of such member providing two flat surfaces 25 and 25a, to which is secured rods or tubing 11a and 11b, respectively. The legs of the angle 26 form the flanges, the edges of which are welded as at 29 to the member 10 by an axially extending weld.

By connecting the members 11 with the member 10, in such a manner that the weld extends axially thereof and not circumferentially, I find that I avoid such weakening of the tubular member 10 as sometimes results from welds extending circumferentially of the member, as would be the case were the tube 11 welded directly to the tube 10. Likewise, by providing the connecting member with flanges which are spaced apart a distance less than the outside diameter of the member 10, and welding such flanges to the member 10 with an axially extending weld, I find that I materially strengthen the tube 10 at the region of the joint. I likewise find that by permitting the connector member 16 to extend axially a distance greater than required for the welding of the member 11 thereto, I avoid for all practical purposes the collapsing of the tubular member 10, due to concentrated strain exerted upon it by the member 11 when force is applied thereto. The abutting of the flat face of the connector member against the tube increases the rigidity of the structure, especially when such member is clamped or pressed into position against the side surface of the tube 10.

I claim:

1. The method of permanently securing together two tubes at an angle to each other, comprising placing against one side of one of the tubes a flanged member having comparatively straight longitudinal edges with such edges in longitudinal contact with the tube, welding the edges of the flanged member to extend longitudinally of the tube with welds extending axially of the tube, abutting a flat cut end of the other tube against a flat outer face of the member and welding the end of the latter tube to such outer face.

2. The method of joining a plurality of smaller tubes to a larger tube comprising welding to the larger tube a flanged member, having substantially straight longitudinal edges which abut the larger tube and extend longitudinally thereof in regions on the same side of a diameter of the larger tube, said flanged member having its exterior flat, and forming the ends of the smaller tubes in planes, abutting them against the planular exterior of the welded member and welding them thereto.

3. The method of permanently securing two tubes to the side surface of a third tube and at different angles thereto, comprising placing against the third tube a flanged member having substantially straight longitudinal edges, with its edges in longitudinal contact with the tube, welding such edges to the tube, with axially extending welds and abutting straight cut ends of two tubes against a flat outer face of the member and welding the ends of the latter tubes to such outer face.

4. The method of joining a plurality of smaller tubes to a larger tube, comprising welding to the larger tube a flanged member having a planular web wider than the diameter of the larger tube and provided with inwardly extending flanges, each having a substantially straight longitudinally extending edge, with such edges abutting the larger tube longitudinally thereof in regions on the same side of a diameter of the larger tube, and forming the ends of the smaller tubes in flat planes at an angle to the axes thereof and abutting them against the flat exterior surface of the web flanged member and welding them thereto.

VINCENT S. PENOTE.